Aug. 6, 1957 Q. W. SIMKINS 2,802,118
TRANSISTOR AMPLIFIER CIRCUITS
Filed June 17, 1954 2 Sheets-Sheet 1

INVENTOR
Q. W. SIMKINS
BY [signature]
ATTORNEY

INVENTOR
Q. W. SIMKINS
BY [signature]
ATTORNEY

United States Patent Office 2,802,118

Patented Aug. 6, 1957

2,802,118

TRANSISTOR AMPLIFIER CIRCUITS

Quinton W. Simkins, Chatham Township, Morris County, N. J., assignor to Bell Telephone Laboratories, Incorporated, New York, N. Y., a corporation of New York Application June 17, 1954, Serial No. 437,457

7 Claims. (Cl. 307—88.5)

Figure 1:
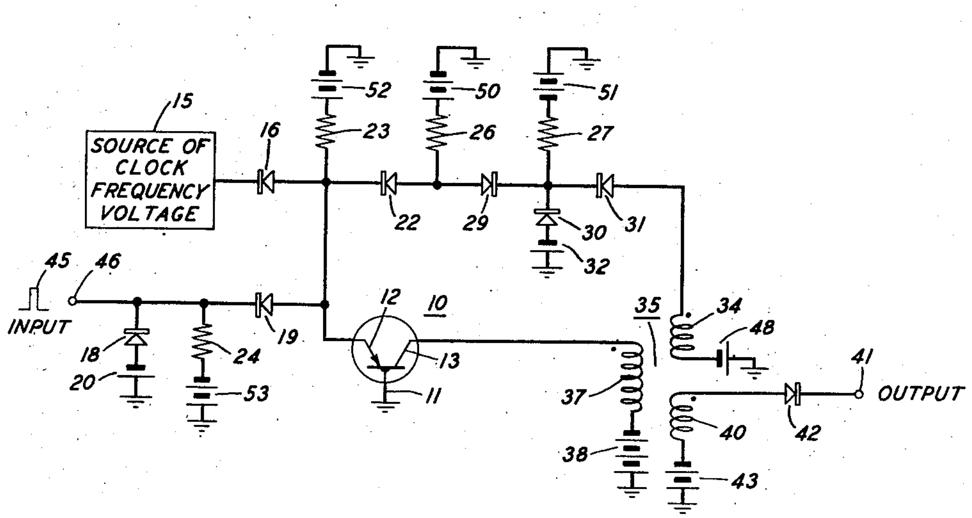

This invention relates to electrical circuits and more particularly to transistor amplifier circuits.

Transistor pulse amplifier circuits are often employed in electrical systems, such as synchronous digital computers, wherein the logical operations are performed by germanium or other type diode circuits, to regenerate the positive information pulses in amplitude, time, and shape. In application Serial No. 437,458, filed June 17, 1954, of J. H. Felker, there is disclosed a regenerative feedback transistor amplifier circuit in which a gated feedback circuit directly connects the collector of the transistor to the emitter. As there disclosed, the circuit includes an output transformer having a primary winding connected to the collector of the transistor and a pair of secondary windings, the first of these being a feedback winding and the other a load winding. A diode or unidirectional current element is placed in series with the feedback winding in the feedback path and is biased so that during the build-up of the current the feedback winding is connected to a low impedance but upon the feedback current reaching a predetermined value, the feedback winding is connected to a high impedance.

It is a general object of this invention to provide an improved transistor amplifier circuit with external feedback.

It is a further object of this invention to facilitate the build-up of current initially through the transistor and in the feedback path.

It is another object of this invention to provide simpler transistor circuits with external feedback and to prevent deleterious effects due to pulsating currents in the feedback secondary winding.

In circuits in accordance with this invention, a diode or other unidirectional current element is placed in series with the load secondary winding of the output transformer and is back biased so that during build-up of the current through the transistor, substantially no current is supplied to the load and substantially all the output current is transmitted as feedback current directly to the emitter of the transistor itself. In this manner, the transistor current builds up very rapidly through the feedback winding and then is substantially entirely switched to the load winding of the output transformer.

The ultimate feedback current in circuits of this type is determined by the values of resistors and supply voltages in the amplifier circuit and is not a function of the transistor parameters or of the amplifier output voltage or current. Thus, once feedback has been established and the prescribed feedback current attained at which the output current is switched from the feedback winding to the load winding and the back bias on the diode in the load circuit overcome, the feedback current does not change with variations in the transistor collector voltage but remains constant until the end of the pulse.

In one specific illustrative embodiment of this invention, pulsating current in the feedback winding, which might give rise to false operation of the circuit, is prevented by connecting the source of clock pulses to the base of the transistor rather than to the emitter. In another specific embodiment wherein the clock source is connected to the emitter, false operation due to the pulsating current in the feedback winding is prevented by employing a second clock source connected to the feedback winding, the two feedback windings being biased to different direct-current voltages and specifically to voltages of opposite signs relative to the base potential, which may advantageously be ground. In this latter embodiment, diode reverse transient effects, which are present in semiconductor diodes to a greater or lesser degree, are avoided by assuring that no diode is switched from a high forward conduction state to a low or zero conduction state at a critical time when the spurious reverse pulse, due to this effect, could give rise to false operation of the circuit.

It is a feature of this invention that a transistor amplifier circuit include an output transformer having distinct feedback and load secondary windings, a unidirectional current element being positioned in the load circuit and back biased to isolate the load from the transistor collector during build-up of current flow through the transistor until the output voltage has attained a predetermined value, whereby the entire transistor collector current during build-up flows in the distinct feedback secondary winding and in the feedback path and assures rapid build-up of the collector current.

It is a further feature of certain specific embodiments of this invention that the clock or timing voltages be applied to the transistor so as to prevent pulsating currents in the feedback secondary winding.

A complete understanding of this invention and of these and other features thereof may be gained from consideration of the following detailed description and the accompanying drawing, in which Figs. 1, 2, 3 and 4 are schematic representations of four specific illustrative embodiments of the invention.

Turning now to the drawing, the specific illustrative embodiment of this invention depicted in Fig. 1 comprises a transistor 10, which may advantageously be a cartridge type point-contact transistor of the type disclosed in Patent 2,524,035, issued October 3, 1950, to J. Bardeen and W. H. Brattain. The transistor 10 has a grounded base 11, an emitter 12, and a collector 13, as is known in the art. Reference is made to application Serial No. 372,897, filed August 7, 1953, of J. H. Vogelsong and to an article "A Transistor Pulse Amplifier Using External Regeneration" by J. H. Vogelsong in vol. 41, page 1444, of the I. R. E. (1953), wherein a prior type of transistor amplifier circuit employing external regeneration is disclosed, for a discussion of the characteristics of transistors of one type that may advantageously be employed in circuits in accordance with this invention. In this embodiment the various bias potentials assume the transistor 10 to be an *n*-type point-contact transistor.

The operation of the gated feedback in the various circuits depicted in the drawing is similar to that described in application Serial No. 437,458, filed June 17, 1954, of J. H. Felker, to which reference is made. However, the circuit depicted in Fig. 1 may be most readily understood from a description of its operation with an input pulse applied and with no input pulse applied, the latter case being discussed first. A sinusoidal frequency voltage is applied from a source 15 through a diode 16 to the emitter 12 of the transistor 10. Diode 16 and the other diodes employed in the circuits described herein may advantageously be of semiconductor material, such as germanium, though other unidirectional current elements known in the art may also be employed. During most of the negative swing of the clock wave, the diode 16 conducts and the emitter potential follows the clock. During this interval, diode 18 conducts; diode 18 is advantageously connected to a source of low negative potential, as of —1.5 volts, and thus holds the input potential at about —2.0 volts, keeping diode 19 cut off. As the clock potential comes up towards zero, diode 16 cuts off and the emitter potential comes up to about —1.6 volts and remains at this potential until the next negative swing of the clock. In one particular transistor employable in this specific embodiment of the invention, the break point, i. e., the point in the emitter characteristic at which the transistor comes out of cut-off, is at or near ground potential; accordingly, there is essentially no emitter conduction while the clock is negative.

During the positive portion of the clock wave, diodes 18 and 22 conduct only slightly, the current therethrough being of the order of 0.1 milliampere or less. The potential at the emitter is therefore determined largely by the voltage divider formed by resistors 23 and 24. With diode 22 practically cut off, resistors 26 and 27 form another voltage divider. The junction of the diodes 29, 30, and 31 is held, throughout this interval, at a negative potential depending on the value of the voltage source 32 connected to diode 30. The potential at this junction is such as to hold diode 31 cut off and to allow diode 30 to conduct less than one milliampere.

As the clock swings negative and the emitter potential drops, the current in resistors 23 and 24 is diverted to the low impedance clock source 15. The clamp diodes 18 and 30 then conduct and supply current to resistors 24 and 27, respectively. Diode 31 is kept in its high impedance state and no current flows in the feedback winding 34 of the output transformer 35 of the transistor, described further below, when there is no input pulse.

The output transformer 35 has a primary winding 37 which is connected to the collector 13 of the transistor and to a source 38 of negative potential. In addition to the one secondary winding 34 in the feedback path of this circuit, the transformer 35 has another secondary winding 40 which is connected to the load circuit, as represented by an output terminal 41, through a diode 42. In accordance with an aspect of this invention, this diode is back biased by several volts, by a negative voltage source 43 connected to the secondary winding 40, and, therefore, no current is allowed to flow in the output winding in the absence of an input pulse.

A positive input pulse 45 is applied to the input terminal 46 and is so phased as to arrive while the clock frequency voltage is negative. Diode 19 will already be cut off, so that the input pulse 45 will have no effect on circuit operation beyond this point until the clock voltage goes positive. At this time the diode 19 will still be held cut off by the input impulse 45 and the emitter potential will rise until the break point in the emitter characteristic is reached. The emitter then becomes a low impedance to ground. Since the break point occurs at a potential close to ground potential, the current in the emitter will be approximately one milliampere and this slight increment in current in the emitter 12 will produce an increment of current in the collector 13. In accordance with an aspect of this invention, this increment current flow in the collector 13 is substantially entirely transmitted back to the emitter 12 through the feedback secondary winding 34 and the feedback path. Diode 42, in the output circuit, is back biased by several volts, by source 43, as described above. Diode 31, in the feedback path, however, is only biased by a very small negative voltage, as of the order of a half volt, from a negative voltage source 48, connected to the feedback secondary winding 34.

The collector current pulse, therefore, initially is transferred entirely to the feedback path and flows through diode 31. This pulse current displaces the current in resistor 27 which previously flowed through diode 29, thereby causing the potential of the junction point of diodes 22 and 29 to rise as less current now flows through resistor 26 from the source 50 connected thereto. As the potential of this junction of diodes 22 and 29 rises, diode 22 becomes conducting and part of the current in resistor 26 is transferred from flowing through diode 29 to flowing through diode 22 and thence directly to the emitter 12 itself. This increased emitter current produces more collector current, which displaces still more current in resistor 27 and additional current is diverted to the emitter.

When the low impedance clock source 15 swings negative, the emitter 12 is also drawn negative, and the current through resistor 26 is diverted away from the emitter into the clock source. The transistor 10 is then cut off or returned to its low conduction state, in which state the emitter impedance is high.

By employing a voltage divider comprising resistors 26 and 27 between the sources 50 and 51 and diode gates, the impedance seen by the feedback winding is changed from a low impedance, during the build-up of the emitter current, to a high impedance, when the back bias on diode 42 has been overcome, and thus in effect the collector current of the transistor is switched from the secondary winding 34 to the secondary winding 40.

Transistors having poorer characteristics can be utilized in amplifier circuits in accordance with this invention than in prior amplifier circuits. Low gain transistors can be utilized by increasing the feedback current and accepting a consequent increase in direct-current power consumption due to current flow in resistors 26 and 27.

In one specific illustrative embodiment in accordance with Fig. 1, the various circuit parameters had the following values:

| | | |
|---|---|---|
| Resistor **23** | ohms | 7500 |
| Resistor **24** | do | 4300 |
| Resistor **26** | do | 1200 |
| Resistor **27** | do | 820 |
| Source **20** | volts | —1.5 |
| Source **32** | do | —1.5 |
| Source **38** | do | —18 |
| Source **43** | do | —6 |
| Source **48** | do | —2 |
| Source **50** | do | 8 |
| Source **51** | do | —8 |
| Source **52** | do | 8 |
| Source **53** | do | —8 |

For the transistor employed in this circuit with the base grounded and —18 volts on the collector, the break point was at ground potential plus or minus 0.25 volt. The total emitter current, with the diode 29 in the feedback path cut off, was about 7.5 milliamperes and, due to the presence of this diode in the feedback path and the voltage divider arrangement therewith, this is the maximum current to the emitter.

The amplitude of the input pulse 45 may be of the order of 2 volts and the output pulse of the order of 6 volts. The direct power consumption of the circuit was less than 200 milliwatts. The clock voltage wave had a peak voltage amplitude of 6 volts and the resultant clock power was approximately 22 milliwatts. The clock voltage frequency in the specific embodiment was 3 megacycles.

Figure 2:
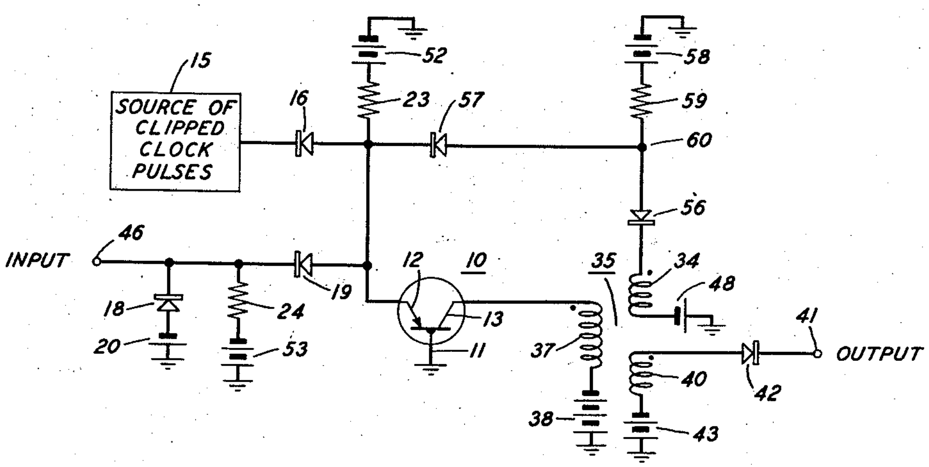

If a sufficiently low base resistance transistor is employed, the circuit of Fig. 1 can be simplified to the embodiment depicted in Fig. 2. In this embodiment, the feedback winding 34 is connected to the emitter 12 through a pair of oppositely poled diodes 56 and 57, a source 58 of positive voltage being connected through a resistor 59 to the junction of the two diodes 56 and 57. What might be called the trigger current normally flows in the voltage divider path from source 52 to source 53 comprising the resistor 23, diode 19, and resistor 24. Current also normally flows from source 58 to source 48 through diode 56 and feedback winding 34. These two paths are arranged so that the diode 57 is normally back biased and these paths are distinct. However, when, due to collector current flow through winding 37, the voltage on winding 34 builds up, the current flow in this path is reduced, raising the voltage at point 60 and causing current now to flow through diode 57 to the emitter 12. As before, application of an input pulse back biases diode 19 and applies the current from source 52 also to the emitter 12.

In order to prevent operation of this circuit, it is desirable that the clock pulses be clipped to a low negative excursion. When the clock voltage wave is negative, current flows through diodes 16, 57, and 56 and in the winding 34, causing a pulsating current in the winding 34 and thus an alternating-current voltage at point 60. This alternating voltage at point 60 may falsely operate the amplifier when the clock wave grows positive by removing the back bias from diode 57. If the negative excursion of the clock wave is limited, however, this may be prevented. The negative excursion of the clock wave must still be sufficient to cut off the transistor. Accordingly, this circuit advantageously employs low base resistance transistors so that only a small negative voltage is required to turn them off.

Figure 3:
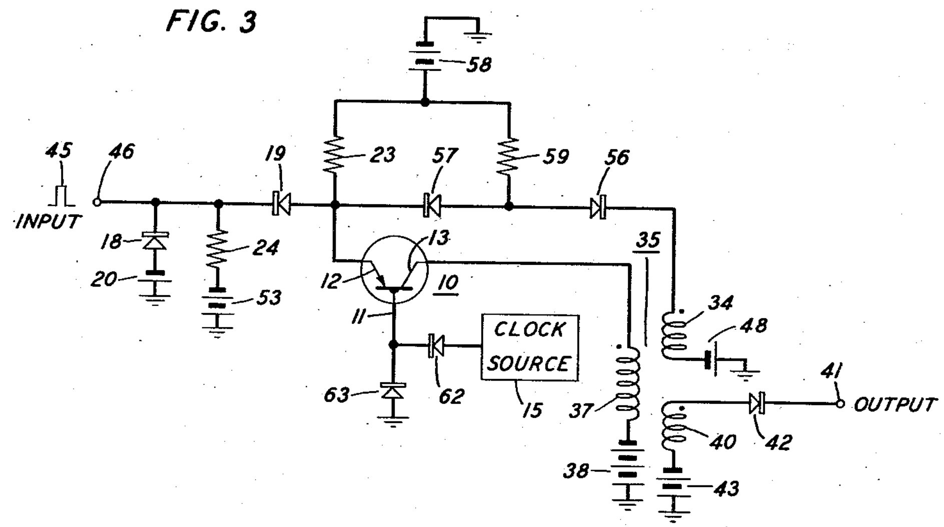

The specific embodiment depicted in Fig. 3 employs the same feedback and triggering paths as the embodiment of Fig. 2, the sources 52 and 58 of Fig. 2 being combined in a single source 58 in Fig. 3; however, the clock source 15 is applied to the base 11 of the transistor 10 rather than to a diode gate in the feedback path. When the clock 15 is positive, the base 11 is maintained positive, as the diode 63 is then back biased, and the transistor is cut off; however, when the clock is negative, diode 62 is back biased and the base 11 is essentially connected to ground allowing the transistor to operate on application of an input pulse to the emitter 12. As the clock wave is not connected in the feedback path the possibility of erroneous operation of the transistor due to a pulsating current in the feedback winding 34 is not present.

In each of the herein described embodiments the diodes are advantageously of semiconductor material, such as germanium. These diodes are expected to pass a large current in the forward direction and then, immediately on the application of a back biasing pulse thereto, no current in the reverse direction. Actually in semiconductor diodes there is a reverse voltage transient effect when a diode which had been conducting a large forward current is suddenly switched to its low conduction state. This transient effect allows a short reverse current flow while the voltage is building up across the diode. If the switching of a diode from a high conduction state to its low zero conduction state occurs at a critical time and location in the circuit, misoperation of the circuit and particularly false firing of the transistor may occur.

Figure 4:
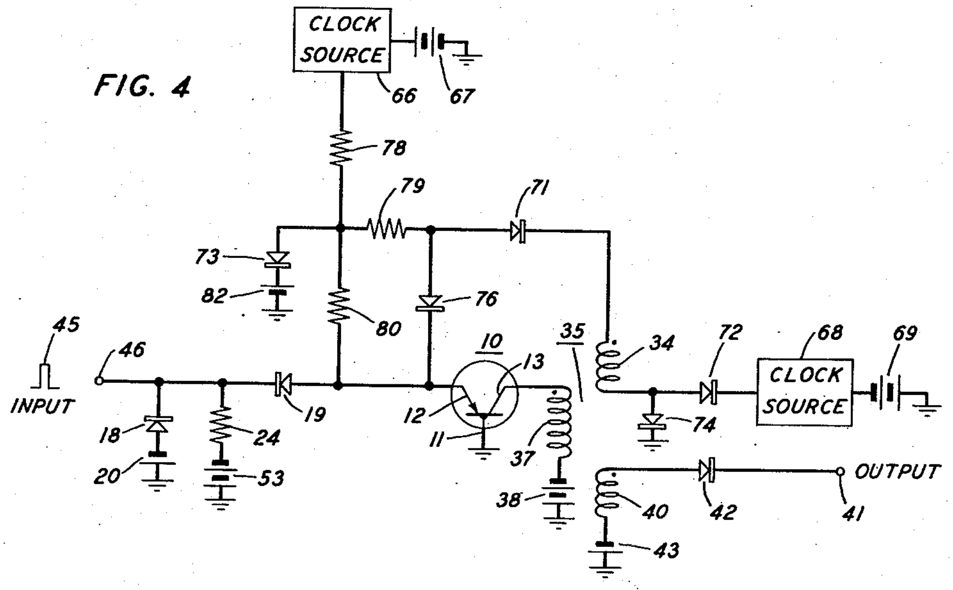

In the specific embodiment of Fig. 4 the circuit is arranged to prevent this. In this embodiment the problem of pulsating current in the feedback path is avoided by utilizing two clock sources, a first clock source 66 biased, as by a source 67, to a positive voltage and a second clock source 68 biased, as by a source 69, to a negative voltage. The two clock voltage waves are in phase and of the same amplitude and frequency. If the clock wave is assumed to be at the peak of its negative half cycle with no input pulse present, then diode 18 is conducting and diodes 71 and 72 are also conducting; all the other diodes in the circuit and the transistor emitter are cut off. As the clock wave goes positive diode 19 begins to conduct replacing part of the current flowing in diode 18, but the transistor remains cut off. As the clock voltage reaches a more positive value, as of the order of 4 volts in one specific embodiment wherein the clock waves were 5 volts root mean square, diodes 73 and 74 begin to conduct and diode 72 ceases conducting. Throughout the pulse interval the emitter is held below the break point and there is no pulse in the collector circuit or load.

However, when an input pulse 45 is applied to input terminal 46 during the negative cycle of the clock wave, diodes 18, 19, 73, 76, 42, and 74 are all cut off while diodes 71 and 72 are conducting. When the clock goes positive the emitter potential is raised since diode 19 is held cut off by the input pulse. When the emitter potential reaches the transistor break point potential the emitter conducts and a pulse of collector current flows as a result. Since the diode 42 is back biased, in accordance with this invention, this current, multiplied by the transformer turns ratio, flows in the feedback winding 34 displacing part of the current previously flowing through diode 71 and the transformer. This raises the potential on the anode end of diode 76 until it conducts completing the feedback loop.

The current from diode 76 flows into the emitter 12, and the feedback builds up rapidly until the entire feedback current has been transferred into the emitter 12 and diode 71 is cut off. With the low impedance feedback path disconnected from feedback winding 34, the output voltage at the transformer winding 37 rises rapidly. The back bias on diode 42 is overcome and power is delivered to the load. The output pulse is terminated by the clock wave swinging negative and cutting off the emitter current.

Restoration of the direct-current level of the pulses in the transformer coupled output may be obtained by adjusting the circuit constants so that the energy stored in the transformer mutual inductances is dissipated in the interval between pulses. Further in the embodiment of Fig. 4 resistors 78 and 79 in series with the feedback winding 34 serve to damp the transformer ringing and dissipate the stored energy. In one specific illustrative embodiment of this circuit as depicted in Fig. 4 wherein a point-contact transistor and germanium diodes were employed, the various circuit parameters were as follows:

| | |
|---|---|
| Resistor **24** | 7,500 ohms. |
| Resistor **78** | 470 ohms. |
| Resistor **79** | 560 ohms. |
| Resistor **80** | 3,600 ohms. |
| Source **20** | −1 volt. |
| Source **38** | —20 volt. |
| Source **43** | —3 volt. |
| Source **53** | —20 volt. |
| Source **67** | 6 volt. |
| Source **69** | —6 volt. |
| Source **82** | 4.5 volt. |
| Clock wave sources **66** and **68** | 3 megacycle, 5 volts R. M. S. |
| Pulse power in | 5 mw. |
| Pulse power out | 80 mw. |
| Pulse gain | 12 db. |
| D. C. power required | 225 mw. |
| Clock power required | 30 mw. |

Reference is made to application Serial No. 437,401, filed June 17, 1954 by J. H. Vogelsong wherein a related invention is disclosed and claimed.

It is to be understood that the above described arrangements are illustrative of the application of the principles of the invention. Numerous other arrangements may be devised by those skilled in the art without departing from the spirit and scope of the invention.

What is claimed is:

1. An amplifier circuit comprising a transistor having an emitter and a collector, an external feedback circuit connecting said collector directly to said emitter, said feedback circuit including a primary winding and a first secondary winding of a transformer, said primary winding being connected to said collector, an output circuit connected to a second secondary winding of said transformer, and means for isolating said output circuit from said transistor during build-up of current through said transistor whereby substantially all said current during said build-up flows in said feedback circuit back to said emitter, said means including a diode in said output circuit and means biasing said diode to prevent conduction therethrough until the voltage across said transformer primary winding has attained a predetermined value.

2. An amplifier circuit in accordance with claim 1 wherein said feedback circuit includes a unidirectional current element and means biasing said element to present a low impedance to said first secondary winding during the initial build-up of current through said transistor and to present a high impedance to said first secondary winding after said current has reached a predetermined value.

3. An amplifier circuit comprising a transistor having an emitter and a collector, an external feedback circuit between said collector and said emitter and including a primary winding and a first secondary winding of a transformer, an output circuit connected to a second secondary winding of said transformer, and means for isolating said output circuit from said transistor during build-up of current through said transistor, said means including a diode in said output circuit and means biasing said diode to prevent conduction therethrough until the collector current through said transformer primary winding has attained a predetermined value.

4. An amplifier circuit comprising a transistor having an emitter, a collector, and a base, an external feedback circuit connecting said collector to said emitter, said feedback circuit including a primary winding and a first secondary winding of a transformer, said primary winding being connected to said collector, an output circuit connected to a second secondary winding of said transformer, means for applying an input pulse to said emitter, means for applying a clock voltage wave to said transistor to time the commencement of conduction through said transistor on application of said input pulse, and means for isolating said output circuit from said transistor during build-up of current through said transistor on the simultaneous application of said input pulse and clock voltage whereby substantially all said current during said build-up flows in said feedback circuit back to said emitter, said last-mentioned means including a diode in said output circuit and means biasing said diode to prevent conduction therethrough until the collector current through said transformer primary winding has attained a predetermined value.

5. An amplifier circuit in accordance with claim 4 wherein said clock voltage wave is applied through a portion of said feedback circuit to said emitter and further comprising means for applying a second clock voltage wave to said second secondary winding, said two clock voltages being in phase and of the same frequency.

6. An amplifier circuit in accordance with claim 4 wherein said clock voltage wave is applied to said transistor base.

7. An amplifier circuit comprising a transistor having an emitter, a collector, and a base, means for applying a signal from said collector to said emitter including a gated feedback circuit, said gated feedback circuit comprising a unidirectional current element and means including said unidirectional current element for presenting a low impedance to said signal during the build-up of said signal and for maintaining a constant emitter current after said signal has reached a predetermined value, an output circuit coupled to said collector, and means for isolating said output circuit from said collector during the initial build-up of said feedback signal, said isolation being removed after said feedback signal has attained a predetermined value.

References Cited in the file of this patent

UNITED STATES PATENTS

| | | |
|---|---|---|
| 2,419,052 | Becker | Apr. 15, 1947 |
| 2,644,893 | Gehman | July 7, 1953 |
| 2,673,936 | Harris | Mar. 30, 1954 |